Nov. 2, 1965      W. C. JOHNSON      3,214,949
METHOD AND APPARATUS FOR EXPANDING HOLLOW ARTICLES
Filed June 24, 1963      3 Sheets-Sheet 1
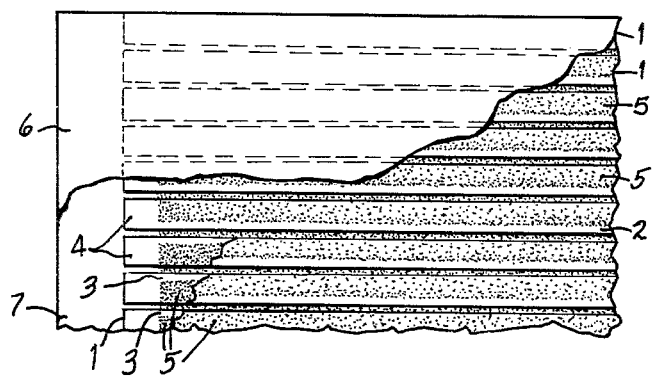
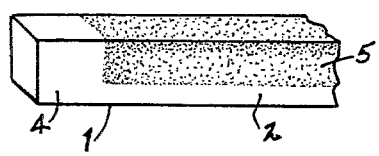
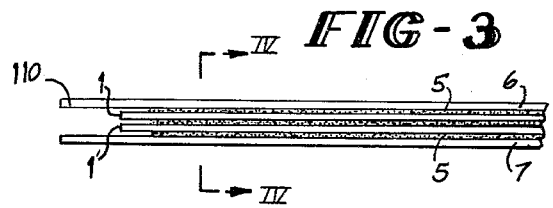
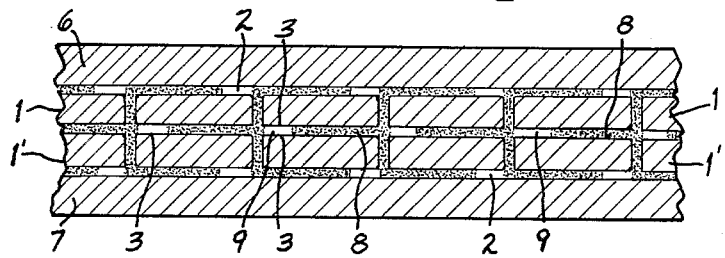
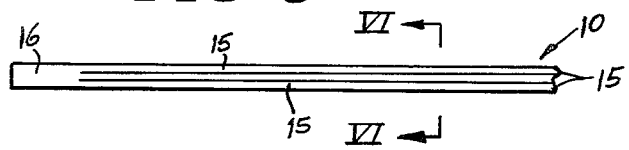
INVENTOR.
WALLACE COLLISTER JOHNSON
BY
*Robert H. Bachman*
ATTORNEY

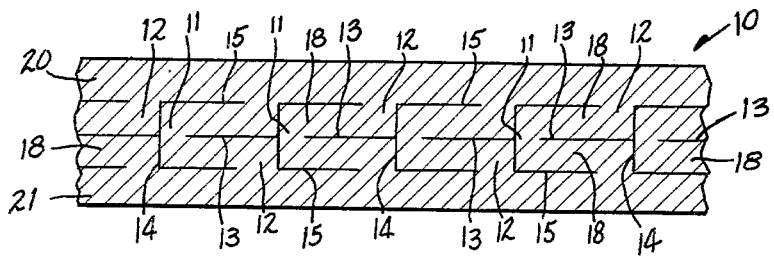
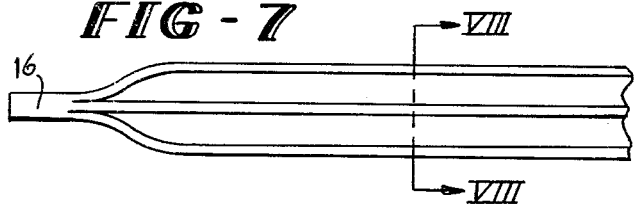
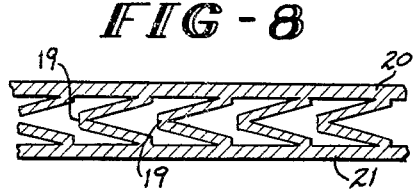
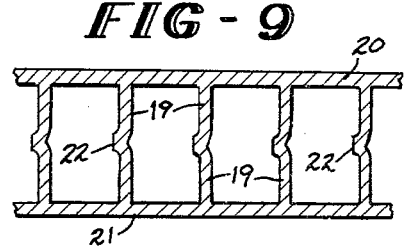
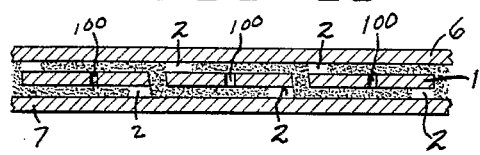
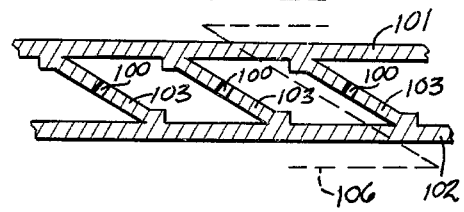
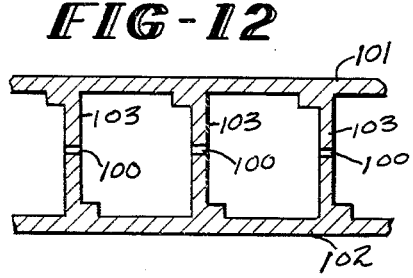

Nov. 2, 1965 W. C. JOHNSON 3,214,949
METHOD AND APPARATUS FOR EXPANDING HOLLOW ARTICLES
Filed June 24, 1963 3 Sheets-Sheet 3

INVENTOR.
WALLACE COLLISTER JOHNSON
BY
ATTORNEY 3,214,949
METHOD AND APPARATUS FOR EXPANDING HOLLOW ARTICLES
Wallace Collister Johnson, St. Davids, Pa., assignor to Olin Mathieson Chemical Corporation
Filed June 24, 1963, Ser. No. 290,066
4 Claims. (Cl. 72—54)

This application is a continuation-in-part of copending application Serial Number 823,960, filed June 30, 1959, now U.S. Patent Number 3,111,747, granted November 26, 1963.

The present invention relates to an apparatus and method for forming flattened hollow articles, especially for use as structural panels.

The above identified co-pending application provides an improved method for making structural panels. This case teaches a method of making hollow articles whose walls are spaced by reinforcing ribs by pressure welding a stack of metal strips partially coated with a weld-inhibiting material, and provides the steps which comprise coating with said material the portions of said strips designed to form said ribs, assembling said strips in a stack, pressure welding said assembly and thereafter expanding said welded assembly without elongating or thinning the metal of said rib portions.

In the expansion step, the panels thereby provided will frequently unfold or expand with a rotary movement. This rotary movement causes difficulties when the panels are inflated, as they commonly are, between flat platens. The flat platens are rigid and do not accommodate the rotary movement, causing frequent scratches and marring of the outer surface of the panel. In an extreme case there may even be damage or distortion to the interior of the structural panel or reinforcing ribs.

Accordingly, it is an object of the present invention to overcome the foregoing disadvantages and provide a new and improved apparatus and method for forming flattened hollow articles.

Generally, the apparatus of the present invention comprises a pair of platens mounted for relative movement in a vertically cooperating relationship and friction reducing means mounting at least one of said platens for movement in a horizontal plane.

The process of the present invention generally provides a method of forming flattened hollow articles comprising interposing a pattern of weld-inhibiting material between superposed sheets; welding said sheets in their adjacent areas not separated by said material; confining said welded sheets between spaced surfaces, at least one of said surfaces being relatively movable in a direction parallel to said sheets; and applying pressure between said sheets while confining said sheets between said surfaces.

It is to be understood that the particular weld-inhibiting pattern is not especially critical, since the process and apparatus of the present invention represent a significant improvement despite variations in choice of pattern as the present invention accommodates any horizontal movement between superposed sheets. The fact that the present invention represents an improvement irrespective of choice of stopweld pattern can be readily understood since any horizontal movement for any reason whatever is readily accommodated.

It has been found that the apparatus and process of the present invention overcome the heretofore encountered disadvantages and provide an extremely effective method and apparatus for forming flattened hollow articles.

Other objects and advantages will be more apparent from the following description and drawings in which:

FIGURE 1 is a partial plan view in section illustrating the assembly of components;

FIGURE 2 is a perspective view illustrating the application of a pattern of weld-inhibiting material to the metal strips employed in FIGURE 1;

FIGURE 3 is a partial side view of the embodiment of FIGURE 1;

FIGURE 4 is a partial sectional view taken along line IV—IV of FIGURE 3;

FIGURE 5 is a side view of a blank welded from the embodiment illustrated in FIGURES 1 to 4;

FIGURE 6 is a partial sectional view taken along line VI—VI of FIGURE 5;

FIGURE 7 is a partial side view of the blank of FIGURE 5 after partial distention thereof;

FIGURE 8 is a partial sectional view taken along the line VIII—VIII of FIGURE 7;

FIGURE 9 is a partial sectional view illustrating the section of FIGURE 8 in a fully expanded form;

FIGURES 10 through 12 illustrate the assembly of components in accordance with the present invention and the distention thereof;

Figure 13:
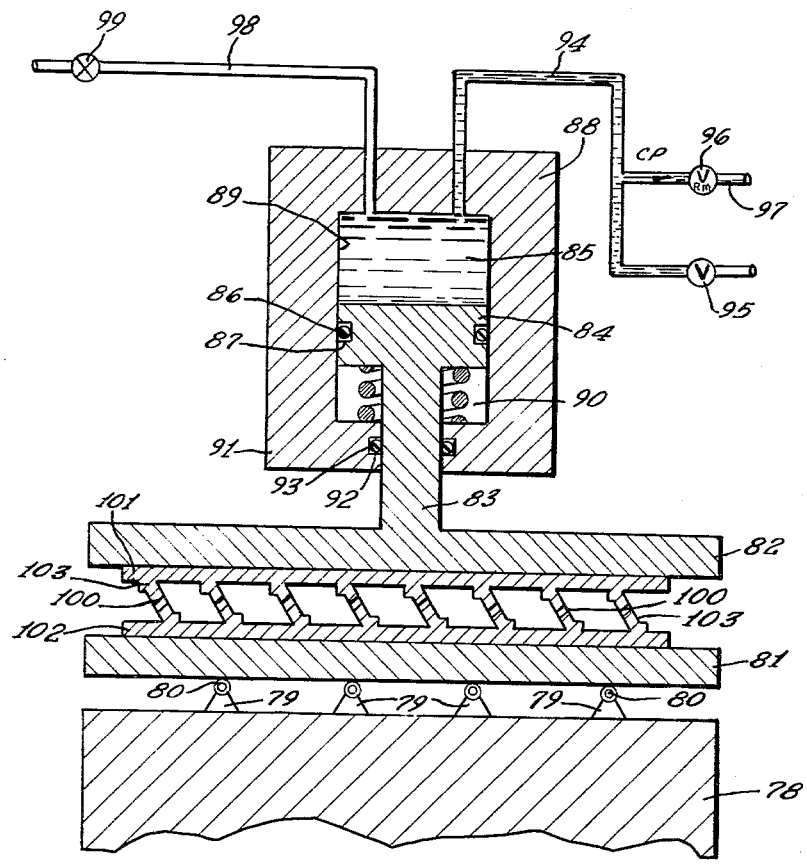
FIGURE 13 is a partially sectional view in elevation illustrating the expansion of panels of the present invention with particular reference to the embodiment of FIGURES 10 through 12.

Referring to the drawings, a plurality of identical insert strips 1 and 1' of 0.100 inch thick ASTM 1100 type aluminum alloy, after a preliminary cleaning and wire brushing of all welding surfaces, are coated with a weld-inhibiting material 5, such as graphite in water glass, on all surfaces so as to provide bands 2 and 3 free of weld-inhibiting material each on opposite faces and adjacent the lateral edges of the strip. For purposes of a preferred subsequent step of expansion, the ends of strip 1 are provided with sections 4 in which all surfaces at both ends of strip 1 are, as bands 2 and 3, also free of weld-inhibiting material.

Subsequent to the application of weld-inhbiting material on a pair of strips 1 and 1', a plurality of such pairs of strips are then superimposed upon each other so that the area on one face of a strip coated with weld-inhibiting material and the band free of weld-inhibiting material are in mating relationship with the coating surface and the uncoated band on the adjacent surface of the other strip to which the first strip is paired. The interior faces of the pair of strips thus sandwich between them a resultant band 8 coated with weld-inhibiting material and a resultant band 9 free of weld-inhibiting material. In the embodiment shown, the outer faces of the pairs of strips 1 are then interposed in spaced and parallel relationship between sheets 6 and 7 of ASTM 1100 type aluminum alloy longer than the strips 1 and 1' so as to project at 110 beyond both ends of the strips. Although the pairs of strips are shown in spaced relationship, it is to be understood that since the sides of the strips are coated with weld-inhibiting material, the spacing includes an arrangement wherein the edges of the strips are in contacting and contiguous relations with each other. The spacing of the strips and sheets is depicted in exaggerated form to denote more clearly the application of weld-inhibiting material between adjacent surfaces. Generally the thickness of the weld-inhibiting material employed will be of the order of 0.001 of an inch, which will be the distance of the spacing between adjacent surfaces.

Although in this embodiment all metal strips 1 have been of equal width, it is to be understood that where a structural panel of angular dimension is desired, the pairs of strips employed between outer sheets 6 and 7 may be of progressively decreasing width.

The assembly depicted in FIGURES 1, 3 and 4 form a stack 0.400 inch thick which is appropriately secured together in some appropriate manner as by spot welding or seam welding across the area adjacent sections 4 of strips 1, so as to prevent relative movement of the components in preparation for a subsequent pressure-welding operation.

Although a specific aluminum alloy was described in the foregoing example, it is to be understood that a variety of metals may be employed depending not only upon economic considerations but particularly upon a specific application to which the panel is put. Thus, the final structural panel of this invention can be made from other aluminum alloys, copper alloys, titanium, zirconium, steel or similar alloys. Similarly, any weld-inhibiting material capable of preventing welding of juxtaposed surfaces may be substituted for the specific weld-inhibiting material described above. Also the metal sheets and metal strips employed may be of any combination of metals for any desired application. For example, if the panel is to be employed for the outer walls of buildings, it is generally preferred that the panel be not only light weight, but in addition, resistant to the elements. For this application, it is readily seen that aluminum is not only suitable, but preferred since it is both relatively light in weight and resistant to oxidation. However, if the structural panel is intended for application which requires it to withstand any type of a more severe loading force, it is readily seen that the panel may be of either heavier gauge or of other metal or a combination of the two. Thus, if the panel is intended for heavier applications, such as floor beds in trucks, the panel may be formed of steel and the like. In addition, where the panel is intended for application in forming bodies of trucks, it will be understood that the structural panel for the floor beds may be formed of steel, whereas the structural panel for the side walls may be formed of aluminum alloys which side walls may be adapted to contain a heat exchange fluid for temperature control if refrigeration is desired.

Similar variables also apply with respect to the specific gauges of the metals employed since the thickness of the metal will vary according to the application intended for the final fabricated unit. Accordingly, the gauges of the components may be selected to give a uniform cross-sectional thickness in all of the components, or any desired variation in thickness between the outer walls and the interconnecting webs or legs between the outer walls. In like manner, the components may be selected from various combinations of metals to provide specific physical properties in the outer surfaces distinguishable from the physical properties in the legs or interconnecting members between them.

Similarly, the panels may be fabricated in any suitable standard lengths for forming either partition walls or exterior walls of buildings. As will be obvious, the panel may be fabricated to suitable dimensions so that it may be employed as a complete unitary structure for any desired application, such as flooring for trucks, airplanes and the like. Or, where a plurality of panels of standard length or width are used, the individual panels may be provided with various types of interconnecting means well known in the art. For example, the panels may be butt-welded to each other or the panels may be provided with projecting flanges so that they may be connected to each other by a screw fastening means, spot welding or with explosive rivets or bolts. When utilized in the erection of walls and buildings, these panels may in like manner be secured to the girder frame work of the buildings.

Subsequent to securing the various components together against relative movement between them, the pack is then ready for pressure-welding together of the strips or components in accordance with conventional practices. Typical conditions with which the panel of this invention is welded are set forth in the well known process of fabricating hollow panels, as refrigerator heat exchangers and the like, disclosed in the patent to Grenell, U.S. No. 2,690,002, granted on September 28, 1954.

In accordance with the conventional practices, the secured assembly of strips and components was heated in a suitable furnace to pressure welding temperatures about 900° F. and immediately rolled between a pair of mill rolls to effect a reduction of about 65 percent to a thickness of 0.14 inch wherein all of the adjacent areas not separated by weld-inhibiting material are pressure-welded to each other resulting in substantially complete erasure of the interfaces between the sheets and strips of metal by interdispersion of the grains between adjacent surfaces. The resultant juncture is usually characterized by tensile strength equal to that of other seamless regions of the structure. As will be underssstood, the amount of reduction required to effect pressure-welding will vary with the particular combination of metals and the physical properties thereof. Generally a reduction of the order of 35 percent will accomplish pressure welding of adjacent surfaces not separated by weld-inhibiting material, however, it will be understood that lower or high percent reductions may be sufficient or required with different metals and/or different temperatures.

By reference to the resultant structure 10 of FIGURES 5 and 6, it can be seen that portions of each insert are pressure-welded to each other at 11 and to the outer sheets at 12, whereas adjacent surfaces separated by weld-inhibiting material result in laminations 13 between faces of the strips, laminations 14 between the sides of the strips, and laminations 15 between a face of the strip and the adjacent metal surfaces 6 and 7. Thus, the pressure welding of a pair of strips 1 and 1′ to each other only along one pair of complementary lateral edges at point 11, and to the outer sheets 6 and 7 only at the other lateral edges at points 12 forms a plait or a plaited section or portion 18 of an embryonic or undeveloped interconnecting reinforcing member or rib 19, with and between integral outer sheets 20 and 21. Thus, as can be seen, the particular pattern of weld-inhibiting material and parameter of strips and sheets provides upon pressure-welding a continuous unwelded portion of metal folded over upon itself to form plaited sections 18. During a subsequent expansion these plaited sections unfold to form the interconnecting cross members or reinforcing ribs 19 between the walls of the structural panel. In the specific embodiment described above, the resultant structure is also provided with a portion 16 completely welded throughout its cross-section, due to the provision of the uncoated sections 4 in strips 1 and 1′.

Although the portions 110 of sheets 6 and 7 projecting beyond the strips 1 are not reduced to as great an extent as the portions of the assembled unit intermediate the ends of strips 1, the pressure-welded portion 16 of pressure-welded unit 10 is sufficiently pressure-welded to withstand the low pressures required for expansion of the structural panel of this invention, since no substantial elongation of any component member is necessary. This specific embodiment is described since it is desired to utilize a low pressure for expansion of the pressure-welded unit into a structural panel. If higher pressures are desired for expanding the panel, projecting portions 110 may have placed between them space filling inserts for welding thereto. In such a modification all portions of the resultant assembly will be reduced, during pressure-welding to the same extent providing pressure welds of equal strength. However, where utilization of a fluid is not desired, the resultant pressure-welded structure 10 may have the pressure-welded portion 16 appropriately cut off or the assembly in FIGURE 1 may be formed of sheets and strips of equal length to provide laminations extending to and at the ends of the resultant welded structure. Such an arrangement is particularly adaptable for expansion, in any circumstance which may warrant it, by means of driving a mandrel through each lamination, in the pressure-welded unit. Alternately, any suitable means may be employed to the surfaces of the panel to separate the outer sheets and unfold the plaited portions, reinforcing ribs 18.

As may be seen with the described embodiment, the laminations are completely contained within the pressure-welded unit which as shown will require a subsequent distention of each and every lamination in each section formed by pairs of strips 1 and the adjacent surfaces of sheets 6 and 7. However, although not shown with respect to the specific embodiment described, strips 1 are preferably provided with orifices to form a means of fluid intercommunication between all sections ultimately formed from and between the pairs of strips 1 and 1' and the adjacent surfaces of sheets 6 and 7. Where such an orifice is provided, it will be understood that the walls of the orifices may be coated with weld-inhibiting material or the orifice filled with a weld-inhibiting material. The pressure-welded unit 10 is ready for expansion, or if desired, the unit may be softened in any appropriate manner as by annealing and thereafter cold rolled to provide either a more even thickness or to final gauge and again annealed which, for the alloy of this embodiment is at a temperature of about 650° to 700° F.

After treatment to obtain the specific conditions desired in the pressure-welded unit 10, a suitable opening is made into the unit 10 into any of the laminations 15 by insertion of a suitable nozzle followed by injection of suitable fluid pressure to expand the unit into structural panels of this invention. Where the strips 1 of this invention are provided with interconnecting orifices, a suitable method of expanding unit 10 is such as disclosed in a patent to Heidorn, U.S. No. 2,756,487, granted on July 31, 1956. This method involves counterboring through one side of unit 10 at a point and to the depth of one of the laminations 15 attaching a nozzle to the bore provided, followed by injection of a fluid pressure to expand the panel.

Another manner of providing a means for injection of a fluid pressure for expanding the pressure-welded assembly may be accomplished by initially providing a tube having its interior surface coated with weld-inhibiting material placed between the projecting portions 110 of sheets 6 and 7 in communicating relationship with the weld inhibiting material between the components of the assembly and projecting externally of the assembly. Subsequent to pressure-welding of the assembly the tube may be readily opened for injecting a fluid pressure into the assembly. As indicated above, other suitable methods of providing an opening into the assembly may be employed whereafter the unit 10 may be expanded without restraint or between spaced apart rigid platens.

Upon injection of fluid pressure into the laminations of pressure welded unit 10, the outer sheets are separated away from each other with a simultaneous unfolding of the plaited portion 18 to form integral interconnecting members or reinforcing ribs 19 which also serve as spacers between the outer walls 20 and 21 of the structural panel. In this manner, the members or ribs 19 are formed by unfolding of the plaited portions 18 without any substantial drawing, thinning or elongation of these inner ribs or members 19. In this manner, there is no resulting weakening of the ribs or members 19. However, it is to be understood that where a greater thickness is desired in the final fabricated structural unit of this application, this may be accomplished by increasing the level of pressure within the pressure-welded unit 10 of FIGURE 5 with subsequent elongation of ribs or members 19. However, where this is done, it will be understood that this can only be accomplished by a step involving the application of this invention to the point wherein elongation of ribs or members 19 begins to take place. A partially expanded panel is illustrated in FIGURES 7 and 8.

In these figures it can be seen that as the outer sheets are separated, the plaited portions, due to the specific manner in which the strips are pressure-welded to each other and to the sheets, are forced, by unfolding, to bend out of parallel with the plane of the walls 20 and 21, formed from sheets 6 and 7, respectively.

Although the specific embodiment illustrated in FIGURE 9 shows flanges 22 projecting from corresponding faces of ribs 19, it can be readily seen that the flanges may be made, if desired, to project in opposed directions from the surfaces of adjacent pairs of ribs 19. This arrangement of flanges 22 provides an additional advantage where the unit is desired to be employed as a heat exchanger, since these flanges can be made to serve as fins for the transmission of heat from and into different heat exchange mediums employed in the tubular cross-sections formed between ribs 19. Upon inflation, it was found that the portions formed by the pressure welding together of strips 1 and sheets 6 and 7 had a thickness of 0.07 inch whereas the unwelded portions of either strip 1 or sheets 6 and 7 had a thickness of 0.035 inch.

FIGURES 10 through 12 illustrate this invention utilizing single insert strips 1 between superposed sheets 6 and 1 which in the embodiment shown in FIGURE 10 forms of a 3-ply assembly of components with bands free of weld-inhibiting material indicated at 2 at which points pressure-welding between the inserts and superposed sheets occurs in this embodiment, to form a plurality of ribs or members, according to the method detailed with more particularity above. The broken line 106 indicates the relative portion of outer walls 101 and 102, and members or ribs 103 forming part of the plaited portion resulting upon pressure-welding of the assembly of FIGURE 10. A plurality of orifices 100 are provided in each of strips 1 in order to provide an intercommunication means between the compartments ultimately forced from the strips. However, in this embodiment, since pressure-welding occurs at points adjacent diagonally opposed lateral edges of strip 1, this in effect forms hinges or pivot points, in subsequent expansion, for relative rotation between the components. Accordingly, upon expansion, consideration must be given to such relative rotation between the components in expanding between flat platens, for obtaining flat outer surfaces.

A suitable apparatus for expanding the pressure-welded unit formed from the assembled components of FIGURE 10 is depicted in FIGURE 13 which includes a permanently fixed base 78 provided with upwardly extending supports 79 on which are mounted a plurality of friction reducing means, such as rollers 80. A flat platen 81 is provided for horizontal movement on rollers 80 and is secured by suitable guide means, not shown, against vertical movement by means well known in the art. A yielding flat platen 82 is provided in vertically cooperating relationship with platen 81, it being evident that the surfaces of platens 81 and 82 and the upper surface of base 78 are all in substantially parallel relationship. Extending from the upper surface of platen 82 is an integral piston rod 83 provided at its upper end with a piston 84. Piston 84 is received in a bore or piston chamber 85 of cylinder 88 in fluid tight relationship by means of an O-ring 86 mounted in groove 87 in piston 84 for sealing relationship with the vertical walls 89 of bore or piston chamber 85. Cylinder 88 is fixed with respect to base 78 in any appropriate manner, not shown.

A suitable resilient means, such as a spring 90 engages a shoulder 91 formed by a radially extending portion at the lower end of cylinder 88, and a shoulder formed between piston 84 and piston rod 83. The shoulder portion 91 is maintained in sealing relationship with piston rod 83 by means of O-ring 92 mounted in a groove 93. Spring 90 urges platen 82 upwardly so as to maintain it in a raised position.

A fluid conduit 94 in communicating relationship with bore or piston chamber 85, in piston 88, is connected through a valve 95 to a source of hydraulic pressure, not shown. A constant fluid pressure is maintained in bore or piston chamber 85, of cylinder 88, by means of a constant pressure inlet valve regulator 96 placed in the fluid network by means of a conduit 97. Pressure regulator 96 is operatively connected to valve 95 so as to close valve 95 when a desired pressure level is reached within bore or piston chamber 85 in cylinder 88. Venting for the fluid pressures within cylinder 88 is provided by means of a conduit 98 in communicating relationship with piston chamber 85 and the atmosphere through means of valve 99. As will be understood, conduit 98 can also by appropriate conduiting return the hydraulic fluid from piston chamber 85 back to the source of fluid pressure referred to above.

Prior to operation, valve 95 will be closed and valve 99 open whereby spring 90 will position platen 82 in the raised position. In operation valve 99 will be closed and the pressure-welded unit fabricated from the assembled components of FIGURE 10 placed on flat platen 81 below 82. Valve 95 is then opened to inject a fluid pressure into piston chamber 85 so as to lower flat platen 82 by depressing spring 90 until a desired pressure level is reached, as for example, 500 pounds differential pressure between the opposed forces, acting on piston 84, fluid pressure and spring 90. When the desired pressure level is reached regulator 96 closes valve 95.

As will be understood a fluid pressure injecting nozzle, not shown, has been previously suitably inserted by means referred to above, in communicating relationship with the laminations formed between the adjacent surfaces separated by weld-inhibiting material. Upon injection of fluid pressure, the outer walls 101 and 102 of the pressure-welded unit separate against the yielding platen 82 while moving horizontally relative to each other, upon unfolding of the plaited portion as indicated at broken line 106. However, since platen 81 is mounted on the rollers 80, it accommodates the rotary movement by moving in the horizontal direction while maintaining contact with outer walls while restraining outer wall 102 parallel with the outer wall 101. As the outer walls 101 and 102 separate away from each other against yielding platen 82, the internal pressure of the panel is reflected within piston chamber 85. However, since a constant pressure within the piston chamber is desired to be maintained by means of regulator 96, this regulator maintains a constant pressure by exhausting the excessive pressure, reflected from the internal pressures within the expanding panel, through conduit 97. It is to be understood that although this specific apparatus is provided with horizontal movement in one of the platens employed, provision for the relative rotation between the components may be provided by other means. For example, a movable structure, similar to platen 81 provided with rollers acting on base 78 or platen 82 may be interposed between the welded unit and one of the platens so that one or both of the outer surfaces of the welded unit is adapted to move in a horizontal direction relative to each other or other components. Upon separation of outer walls 101 and 102 away from each other, the unwelded portions of strip 1 forming part of the plaits, rotate into a vertical position as cross-members or legs 103. A partially expanded structural panel with the legs 103 in a partially unfolded position are illustrated in FIGURE 11. A fully expanded structural panel with the cross-members or legs further unfolded and developed in a fully stretched position, without any substantial drawing, elongation or thinning of these cross-sections is illustrated in FIGURE 13.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. Apparatus for controlling the fluid expansion of a flattened hollow article having interior portions which rotate during expansion, the apparatus comprising
    (A) first stationary support means,
    (B) a first rigid platen,
    (C) means supporting said first rigid platen from said first support means for movement constrained in a vertical direction,
    (D) second stationary support means in substantially parallel relationship to said first rigid platen,
    (E) a second rigid platen in substantially parallel relationship to said first rigid platen,
    (F) friction reducing means supporting said second rigid platen on said second support means for movement in a horizontal plane during movement of said first rigid platen in a vertical direction,
    whereby said second rigid platen may slide horizontally and said first rigid platen may raise vertically to accommodate the rotating motion of said interior portions of said hollow article upon expansion thereof.

2. Apparatus according to claim 1 wherein said means supporting said first rigid platen comprises pressure-responsive means.

3. Apparatus according to claim 2 wherein said pressure-responsive means comprises
    (A) a piston rod integral with said first rigid platen,
    (B) a piston integral with said piston rod,
    (C) a fluid tight piston chamber receiving said piston,
    (D) resilient means in operative relationship to said piston for vertical movement,
    (E) a fluid conduit in communicating relationship with said piston chamber,
    (F) a source of hydraulic pressure in communicating relationship with said piston chamber, and
    (G) means for maintaining constant fluid pressure in said piston chamber.

4. A method of expanding a substantially flat blank having interior portions joining opposed outer faces of said blank, wherein said interior portions rotate upon expansion of said blank, the method comprising
    (A) confining said blank between first and second surfaces, opposed outer faces of said blank being in contact with said first and second surfaces,
    (B) applying distending pressure to the interior of said blank to force apart said outer faces thereof,
    (C) allowing one of said first and second surfaces to move in a direction parallel to said blank as the interior portions thereof rotate, and
    (D) allowing the other of said first and second surfaces to yield in a direction perpendicular to said blank.

References Cited by the Examiner
UNITED STATES PATENTS

| | | | |
|---|---|---|---|
| 2,743,667 | 5/56 | White | 100—295 X |
| 2,812,543 | 11/57 | Stacy. | |
| 2,857,659 | 10/58 | Staples | 29—157.3 |
| 2,996,792 | 8/61 | Mackie | 29—157.3 |
| 3,000,088 | 9/61 | Melzer | 29—421 |
| 3,046,638 | 7/62 | Melzer | 29—155 |
| 3,094,956 | 6/63 | Pauls | 113—44 |

WHITMORE A. WILTZ, *Primary Examiner.*

JOHN F. CAMPBELL, *Examiner.*